C. RHINEHART.
BORING MACHINE.
APPLICATION FILED SEPT. 9, 1908.
907,883.
Patented Dec. 29, 1908.
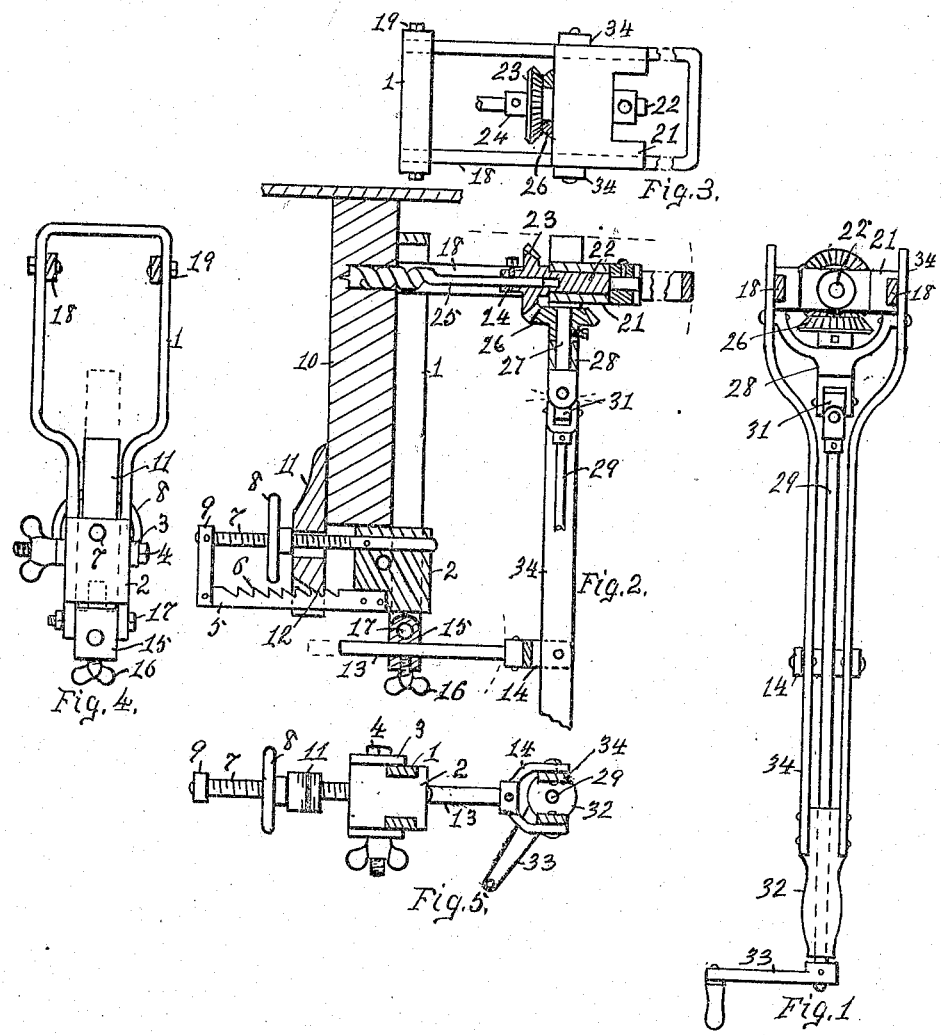
Witnesses,
Roy Brosier
Samuel S. Carr
Charles Rhinehart, Inven
By Robert S. Carr, Att'y

UNITED STATES PATENT OFFICE.

CHARLES RHINEHART, OF LIMA, OHIO.

BORING-MACHINE.

No. 907,883.  Specification of Letters Patent.  Patented Dec. 29, 1908.

Application filed September 9, 1908. Serial No. 452,340.

*To all whom it may concern:*

Be it known that I, CHARLES RHINEHART, a citizen of the United States, residing at Lima, Allen county, Ohio, have invented a new and useful Improvement in Boring-Machines, of which the following is a specification.

My invention relates to boring machines of the class adapted to the use of electricians or others for use in boring through joists in buildings or for other purposes, and the objects of my improvements are to provide means for boring holes in different angles and where the operating space is too limited to permit the use of an ordinary brace; to provide means for turning an auger or bit and for simultaneously exerting a pressure longitudinally thereon; to provide means for removably securing the device in operative position; to provide means for moving the auger bit in a straight line, and to provide simple and durable construction and assemblage of parts for securing facility of operation and efficiency of action. These objects are attained in the following described manner as illustrated in the accompanying drawings, in which:—

Figure 1 is a front elevation of a boring machine embodying my improvements; Fig. 2, a longitudinal section; Fig. 3 a plan of the guide and sliding head; Figs. 4 and 5, a front elevation and a plan respectively of the clamping jaws and connections.

In the drawings, 1 represents a guide frame, 2 a vise block adjustably secured thereon by means of clamps 3 and a clamping screw 4, as shown in Fig. 5. A bar 5 formed with notches or teeth 6 and a rod 7 having a hand wheel 8 adjustably threaded thereon are extended rearwardly from the block and terminate in a tie bar 9. A jaw 11 slidably mounted on said rod and bar is formed with a tooth 12 near its lower end adapted to fulcrum on one of the corresponding teeth 6 for the hand wheel to move the jaw with its upper portion into clamping contact with a joist 10 as shown in Fig. 2. An arm 13 provided with a fulcrum yoke 14 is secured in longitudinal adjustment in block 15 by means of the thumb screw 16 and said block is pivotally secured on the lower portion of the guide frame 1 by means of a bolt 17 whereby said arm may move in different vertical angles.

A yoke 18 is maintained in different vertical angles of adjustment on the upper portion of the guide frame 1 by means of screws 19, and the cross head 21 wherein the spindle 22 is journaled is slidably mounted thereon. Said spindle is provided with a bevel gear 23 and formed with the usual socket or chuck 24 for the removable engagement therewith of the shank of an auger or bit 25. A bevel gear 26 in continuous engagement with gear 23 is removably secured to a short shaft 27 whereby it is journaled in a bearing 28 which is carried by the cross-head 21. A shaft 29 connected with the shaft 27 by a toggle joint 31 is journaled through a handle bearing 32 and provided on its lower end with a crank 33. Said handle bearing is secured to a lever 34 which is fulcrumed at an intermediate point on yoke 14 and pivotally secured near its upper end to the cross head 21.

In operation, the device may be securely clamped in the desired position on a joist or elsewhere, as shown in Fig. 2. The yoke 18 may be adjusted in the desired angle on the guide frame, and the spindle with the auger actuated by means of the bevel gear and toggle joint connections with the crank shaft. The toggle joint in the crank shaft and also the free vertical movement of the fulcrum yoke permits the cross head to be moved for feeding or removing the auger in the straight line of yoke 18 by means of the hand lever without binding thereon or changing the proper relative position of the gears.

Having fully described my improvement, what I claim as my invention and desire to secure by Letters Patent of the United States is:—

1. In a boring machine, the combination of a guide-frame, a clamp for securing said frame in place, a yoke pivoted to said frame, an adjustable arm also pivoted to said frame, a cross-head mounted to slide on said yoke, a bit-chuck journaled in said cross-head, a hand lever fulcrumed on said arm and connected to said cross-head, a crank shaft mounted in said lever, and gearing for transmitting motion from said shaft to said chuck.

2. A boring machine comprising a clamp mechanism, a guide-frame secured adjustably thereto, a yoke connected to the frame and angularly adjustable with respect thereto, a cross-head slidably mounted on said yoke, a spindle journaled in said cross-head, a hand lever connected to said cross-head, a crank shaft mounted longitudinally in said lever, a universal joint in the crank shaft, intermeshing gears connected to said spindle and said crank shaft, and an arm connected to said lever and movably connected to the guide-frame.

CHARLES RHINEHART.

Witnesses:
JOHN M. BOOSE,
CRETA SHULER.